(12) United States Patent
Fan

(10) Patent No.: US 9,369,418 B2
(45) Date of Patent: Jun. 14, 2016

(54) DETERMINING ADDITIONAL INFORMATION ASSOCIATED WITH GEOGRAPHIC LOCATION INFORMATION

(71) Applicant: Alibaba Group Holding Limited, George Town (KY)

(72) Inventor: Di Fan, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 191 days.

(21) Appl. No.: 14/018,216

(22) Filed: Sep. 4, 2013

(65) Prior Publication Data

US 2014/0074950 A1 Mar. 13, 2014

(30) Foreign Application Priority Data

Sep. 13, 2012 (CN) .......................... 2012 1 0340156

(51) Int. Cl.
*G06F 17/27* (2006.01)
*H04L 12/58* (2006.01)

(52) U.S. Cl.
CPC .............. *H04L 51/20* (2013.01); *H04L 51/063* (2013.01); *H04L 51/08* (2013.01)

(58) Field of Classification Search
CPC ......... H04L 51/08; H04L 51/04; H04L 51/18; H04L 51/20
USPC ................................................. 709/206, 204
See application file for complete search history.

(56) References Cited

U.S. PATENT DOCUMENTS

| 8,601,004 | B1* | 12/2013 | Mahadevan et al. ........... 707/751 |
| 2007/0225017 | A1* | 9/2007 | Li et al. ...................... 455/456.1 |
| 2007/0299815 | A1* | 12/2007 | Starbuck et al. .................. 707/3 |
| 2009/0287784 | A1* | 11/2009 | Haruna .......................... 709/206 |
| 2010/0088185 | A1 | 4/2010 | Wen et al. |
| 2010/0179754 | A1* | 7/2010 | Faenger et al. ................ 701/208 |
| 2010/0313250 | A1* | 12/2010 | Chow ................................ 726/5 |
| 2011/0231507 | A1 | 9/2011 | Appelman |

FOREIGN PATENT DOCUMENTS

| CN | 101212713 | 7/2008 |
| CN | 101291490 | 10/2008 |
| JP | H10-107833 | 4/1998 |
| JP | H11-53278 | 2/1999 |
| JP | 200291983 | 3/2002 |
| JP | 2002288213 | 10/2002 |
| KR | 20080033647 | 4/2008 |
| KR | 20080033647 A | 4/2008 |

OTHER PUBLICATIONS

Hufuqishe, Searching Maps Through Chatting, Beginner's Forum. Sep. 15, 2006.

* cited by examiner

*Primary Examiner* — Brian J Gillis
*Assistant Examiner* — Matthew Ballard
(74) *Attorney, Agent, or Firm* — Van Pelt, Yi & James LLP

(57) ABSTRACT

Determining additional information associated with geographic location information included in a message is disclosed, including: receiving a message including geographic location information from a first device; extracting the geographic location information from the message; determining additional information associated with the geographic location information; and sending the message and the additional information to a second device.

19 Claims, 9 Drawing Sheets

DETERMINING ADDITIONAL INFORMATION ASSOCIATED WITH GEOGRAPHIC LOCATION INFORMATION

CROSS REFERENCE TO OTHER APPLICATIONS

This application claims priority to People's Republic of China Patent Application No. 201210340156.5 entitled A METHOD AND EQUIPMENT FOR ACQUIRING GEOGRAPHIC LOCATIONS IN CHAT CONTENT, filed Sep. 13, 2012 which is incorporated herein by reference for all purposes.

FIELD OF THE INVENTION

The present invention relates to network messaging technology. In particular, the present application relates to techniques for determining additional information associated with geographic locations included in a message.

BACKGROUND OF THE INVENTION

Conventionally, a user may use a piece of terminal equipment to send and receive text and/or voice messages with another user using a different piece of equipment. In some instances, the terminal equipment may receive a text or voice message that includes a geographic location. The message receiving user of the terminal equipment may not recognize the mentioned geographic location because there may be a typographical error included in the described geographic location and/or the message receiving user may simply be unfamiliar with the described geographic location. As such, the users may engage in several messages to discuss the location. As a result, much time and labor are expended in ascertaining a more accurate and/or precise geographic location.

Sometimes, when the message receiving user does not recognize a mentioned geographic location, the user may perform an Internet search to ascertain the location on a map and/or query for more information associated with the mentioned geographic location. However, manually searching for a mentioned geographic location may be time consuming and may also disrupt the communication between the users.

In the event that the message receiving user's terminal equipment does not permit for the user to simultaneously use two different applications (e.g., one application to send and/or receive messages and a second application to perform an Internet search), the message receiving user may need to close the messaging application altogether before performing the Internet search. Some types of terminal equipment may take a long time to switch between different applications, which can also detract from a user's messaging experience. Then after the message receiving user has determined the desired information through searching, the user will need to exit the search application (e.g., a web browser application) and re-engage with the messaging application. This process of ascertaining more information for a mentioned geographic location may involve many trivial steps and may also stall the communication between the users.

BRIEF DESCRIPTION OF THE DRAWINGS

Various embodiments of the invention are disclosed in the following detailed description and the accompanying drawings.

DETAILED DESCRIPTION

Figure 1:
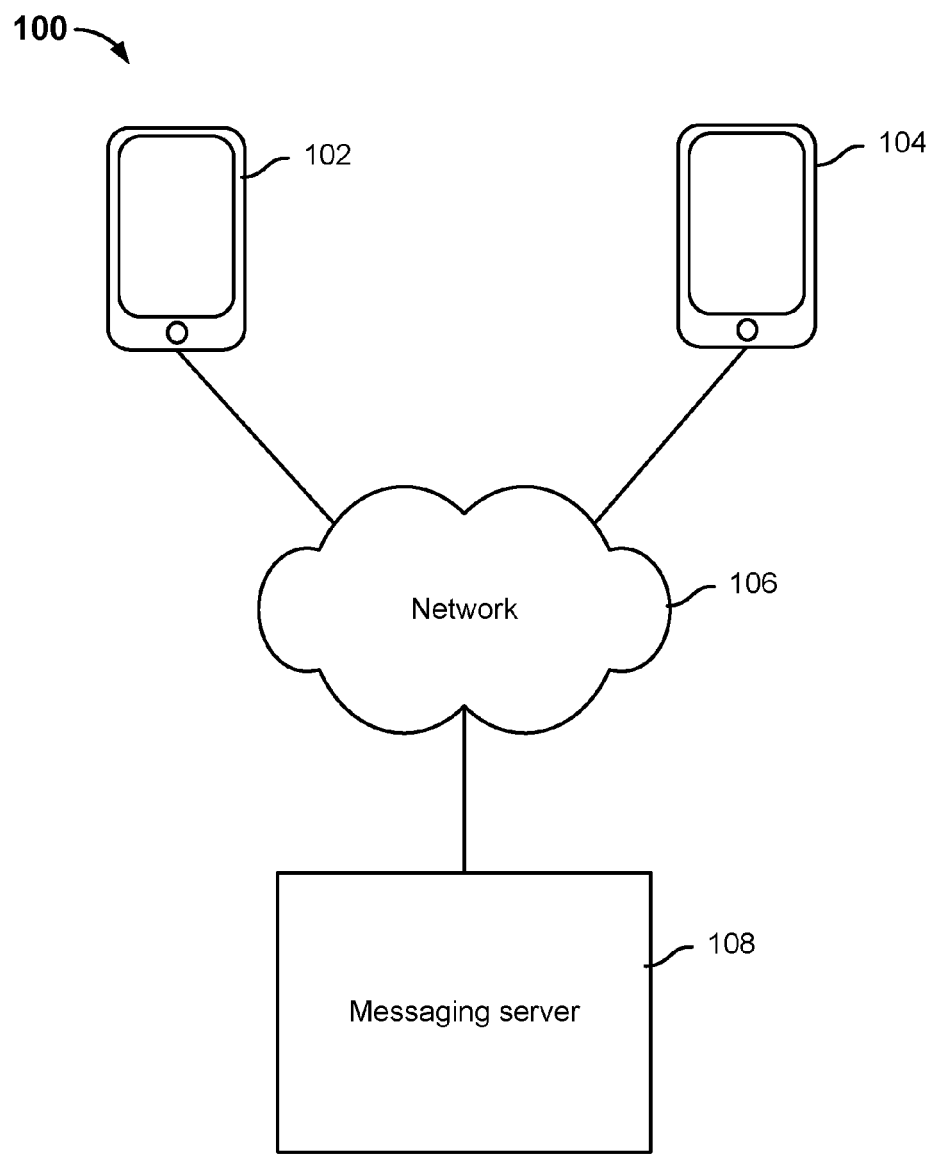
FIG. 1 is a diagram showing an embodiment of a system for determining additional information associated with geographic location information included in a message.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of determining additional information associated with geographic location information included in a message are described herein. A message that includes geographic location information is generated at a first device. Examples of the message include a text message, a voice message, and/or an email message. The geographic location information may include an address, a name of a business, an area, and a name of a building, for example. The geographic location information included in the message may be recognized. In some embodiments, the geographic location information is recognized based on a recognition technique that is associated with the format of the message (e.g., the format of the message may be text or voice-based). Additional information associated with the recognized geographic location information may be determined. In some embodiments, additional information associated with the geographic location information includes pictures associated with the geographic location information, links to information associated with the geographic location information, and/or an area on a map associated with the geographic location information. The additional information and the original message are both sent to a second device.

FIG. 1 is a diagram showing an embodiment of a system for determining additional information associated with geographic location information included in a message. System 100 includes first device 102, second device 104, network 106, and messaging server 108. Network 106 includes high-speed networks and/or telecommunications networks.

Each of first device 102 and second device 104 may comprise a mobile device, a smart phone, a tablet device, a computer, and/or any type of computing device. A messaging application may be executing on each of first device 102 and second device 104. A first user using first device 102 may input a message (e.g., via text or via a voice recording) with the messaging application to be sent to a second user using second device 104 (e.g., over network 106). Similarly, the second user using second device 104 may input a message (e.g., via text or via a voice recording) with the messaging application to be sent to the first user using first device 102. As such, the first and second users may communicate over sending and receiving messages with their respective devices. In some embodiments, messaging server 108 is configured to provide a messaging service over network 106 to users of devices such as first device 102 and second device 104. For example, a message intended to the second user associated with second device 104 may first be sent from first device 102 to messaging server 108 and then messaging server 108 is configured to forward the message to second device 104. In some embodiments, first device 102 may send a message directly to second device 104 (e.g., over network 106) without using messaging server 108 (e.g., where first device 102 and second device 104 are engaged in a point-to-point connection).

As will be described further below, in different embodiments, any one of first device 102, second device 104, and messaging server 108 may be configured to recognize and extract geographic location information from a message (e.g., input by a first user at first device 102) and determine additional information associated with the geographic location information. In various embodiments, additional information associated with the geographic location information comprises a map, a picture, and/or links to information that is relevant to the geographic location information. Also, as will be described further below, in different embodiments, the message as well as the additional information associated with the geographic location information are received and displayed at the receiving device (e.g., second device 104). Therefore, the user that received the message may immediately simultaneously view the message and the additional information to learn the context and/or details associated with the geographic location information that is mentioned in the message.

Figure 2:
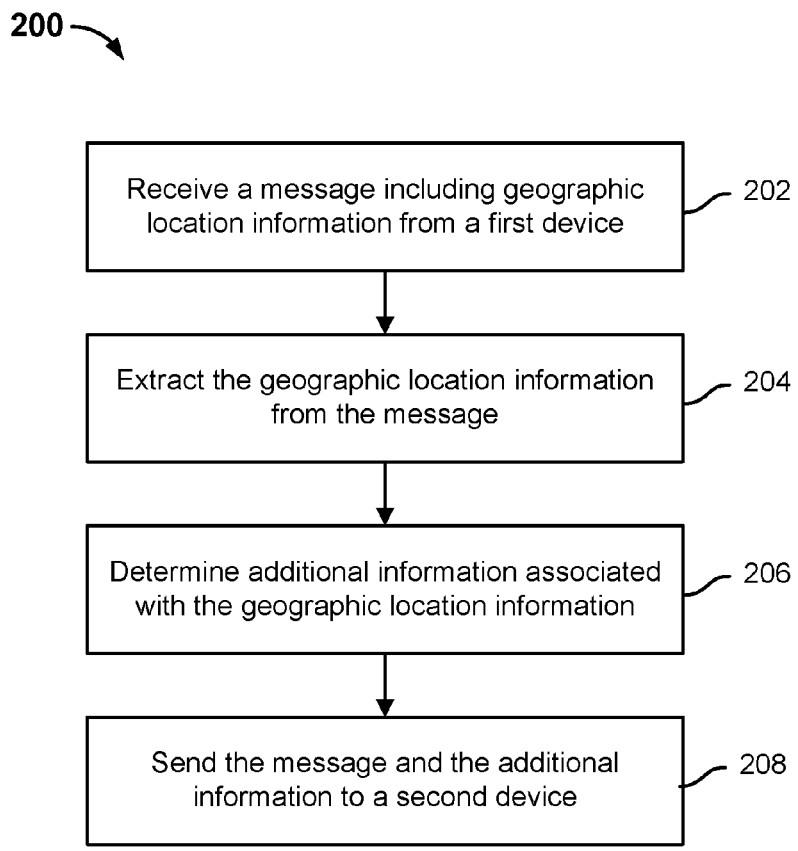
FIG. 2 is a flow diagram showing an embodiment of a process for determining additional information associated with geographic location information included in a message.

FIG. 2 is a flow diagram showing an embodiment of a process for determining additional information associated with geographic location information included in a message. In some embodiments, process 200 is implemented at messaging server 108 of FIG. 1.

Process 200 shows an example of using a messaging server associated with the message application executing at each of a sending device and a receiving device to determine the additional information associated with geographic location information that is included in a message. In the example, the messaging server facilitates passing of messages between the first device and the second device. While either of the first device and the second device may send and receive messages, in the examples used herein, a message is generated at the first device, to be sent to the second device.

At 202, a message including geographic location information is received from a first device. The message is sent from the first device (e.g., over a network) to a messaging server associated with the messaging service used by a first user and a second user. The messaging server is configured to receive the message and then send it to the second device associated with the second user, the recipient of the message.

The message may be text-based and/or voice-based, for example. In some embodiments, the message is generated using a messaging application executing at the first device. For example, a first user using the first device may have input the content of the message through a user interface (e.g., a keyboard or a touchpad) or via a microphone associated with the first device. For example, the first device may comprise a mobile device that is connected to a network and configured to send a message to a second device over the network. In some embodiments, the message comprises an instant message. In some embodiments, a messaging session has already been established between the first device and the second device or the messaging session is initiated by virtue of this message being sent from the first device to the second device. The first device may be used by a first user who wishes to send the message to a friend, a second user, using a second device. In some embodiments, along with the message, identifying information associated with a second device associated with a second user (the receiver of the message) is also received from the first device. For example, the identifying information associated with second user may include a username of the second user's at a messaging service.

Geographic location information includes descriptions associated with one or more locations, including an address, a name of a business, an area, a name of a public location (e.g., a park), and a name of a building, for example. For example, the message may include, "Let's play tennis at 2 pm at Memorial Park." In the example, "Memorial Park" comprises the geographic location information in the message.

At 204, the geographic location information is extracted from the message. The geographic location information may be identified by the messaging server using a recognition technique associated with the format of the message. For example, if the message were text-based, a text-based recognition technique may be used and if the message were voice-based, a voice-based recognition technique may be used. In some embodiments, if the message were voice-based, a voice to text translation technique may be used to first translate the message into text. The portion of the message associated with geographic location information may be recognized by comparing the message to templates associated with geographic information (e.g., a template associated with an address, a template associated with a name of a business, a template associated with an area, a template associated with a name of a public location, and a template associated with a name of a building), for example. Once the geographic location information portion of the message is recognized, it is extracted for separate processing. Returning to the previous example, a template for names of public parks "<Name> park" may be used to match to "Memorial Park" of the message. Therefore, "Memorial Park" is extracted as geographic location information of the message.

At 206, additional information associated with the geographic location information is determined. A search for information relevant to the geographic location information may be performed from one or more predetermined databases, via a map application, and/or via a search engine. In some embodiments, the area on the map associated with the geographic location information may be determined (e.g., using a third party map application) and a portion of the map associated with the geographic location information (or a link thereof) may be determined as additional information. The portion of the map may include a visual marker that indicates the location identified in the geographic location information. In some embodiments, one or more pictures relevant to the geographic location information may be determined as additional information. In some embodiments, links (e.g., web addresses, uniform resource locators) referencing information (e.g., websites, images, maps) associated with the geographic location information are determined as additional information. In various embodiments, the determined additional information may include various types (e.g., a map, an image, and/or a link). Additional information is not limited to only those types described herein.

In some embodiments, the geographic location information is first validated prior to determining additional information associated with the geographic location information. For example, if the geographic location information does not match a known geographic location information (e.g., in a database, map, and/or address directory), then the geographic location information is presumed to be spelled incorrectly and is not successfully validated. Alternative geographic location information may be determined if the original geographic location information is not successfully validated. For example, alternative geographic location information may be determined based on at least a portion of the original geographic location information. For example, if the street number of the original geographic location information could not be found in a database, map, and/or address directory, then alternative geographic location information including a known street number that is close to the original street number is determined. In another example, if the spelling of the geographic location information is determined to be incorrect, then alternative geographic location information including a correctly spelled version of the original geographic location information is determined. In yet another example, if the geographic location information cannot be matched to any type of known geographic location, then alternative geographic location information including known geographic location information that is at least partially a homophone of at least a portion of the original geographical location information is determined. Other techniques of validating geographic location information and/or generating alternative geographic location information may be used as well. Once the alternative geographic location information is determined, additional information associated with the alternative geographic location information is determined.

In some embodiments, prior to using the alternative geographic location information to determine additional information, the messaging server sends a prompt to be displayed at the first device to allow the first user to confirm the use of the alternative geographic location. The prompt includes the alternative geographic location information and may include a control such that in the event the first user selects the control, the alternative geographic location information is confirmed to be used to determine additional information (in lieu of the original geographic location information included in the message). In some embodiments, the alternative geographic location information is used to determine additional information without first sending a prompt to the first device.

At 208, the message and the additional information are sent to a second device. The messaging server is configured to send the additional information along with the original message to the second device (e.g., over a network). The original message, including the geographic location information, and the additional information (e.g., map, pictures, link) determined based on the geographic location information are sent to and displayed at the second device so that the second user may simultaneously consume the first user's message as well as the additional information that has been determined based on the geographic location information included in the message. The additional information (e.g., map, pictures, links) may be displayed with the message in the messaging application executing at the second device. In some embodiments, the messaging server may generate and send special computer instructions with the message and the additional information to the second device that is configured to cause the second device to simultaneously display the message and the additional information. This way, the second user does not need to manually perform research on geographic location information provided by the first user that the second user may not be familiar with. The second user using the second device may subsequently send a message destined for the first user using the first device to the messaging server, which will forward the message to the first device.

For example, the message received from a first device includes the Chinese characters of "杭州 [Hangzhou] 唐妙璐 [Tangmiaolu] 产业园 [Industrial Park]." After receiving the message, the messaging server extracts the two geographic locations of "杭州 [Hangzhou]" and "产业园 [Industrial Park]" from the message. The messaging server is able is match "杭州 [Hangzhou]" to a known geographic location (a city in the Zhejiang province of China) but is unable to match the geographic location of "唐妙璐 [Tangmiaolu]" to a known geographic location. However, through search comparisons and/or fuzzy searches, the messaging server determines an alternative geographic location that is "塘苗路 [Tangmiao Road]," which is a known geographic location (a road in the city of Hangzhou) that is a homophone to "唐妙璐 [Tangmiaolu]." The alternative geographic location information of "杭州 [Hangzhou] 塘苗路 [Tangmiao Road] 产业园 [Industrial Park]" is marked on a map application and a portion of the map that includes the alternative geographic location information is determined as additional information that is sent with the message to the second device. In some embodiments, the message that is sent with the additional information may also be modified to include the alternative geographic location. Therefore, in this example, the modified message would be "杭州 [Hangzhou] 塘苗路 [Tangmiao Road] 产业园 [Industrial Park]" (instead of the message that was "杭州 [Hangzhou] 唐妙璐 [Tangmiaolu] 产业园 [Industrial Park]").

Figure 3:
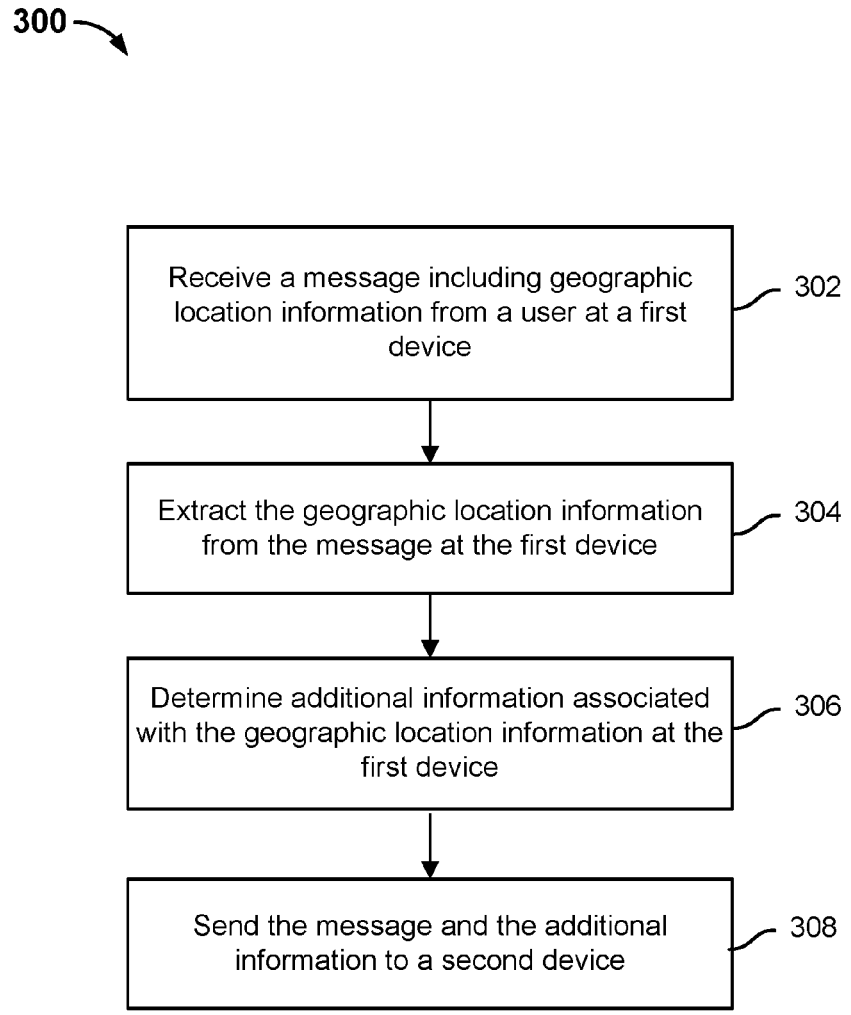
FIG. 3 is a flow diagram showing an embodiment of a process for determining additional information associated with geographic location information included in a message.

FIG. 3 is a flow diagram showing an embodiment of a process for determining additional information associated with geographic location information included in a message. In some embodiments, process 300 is implemented at first device 102 of FIG. 1.

Process 300 shows an example of using the first device (the device that generates the message) to determine additional information associated with the geographic location information included in the message. Process 300 shows that in some embodiments, the first device, the device that generates the message, may be configured to determine the additional information associated with the geographic location information.

At 302, a message including geographic location information is received from a user at a first device. The message may include alphanumeric characters, images, and/or voice recording, for example. The message may have been input by a first user using the first device through a user interface and/or microphone. The message may be received by a messaging application executing at the first device. The message is to be sent to a second user associated with a second device. In some embodiments, identifying information associated with the second user to whom the message is intended is also received at the first device.

At 304, the geographic location information is extracted from the message at the first device. For example, the message application executing at the first device may be configured to recognize and extract the geographic location information portion from the message received from a user. In some embodiments, the geographic location information may be extracted from the message and the alternative geographic location information may be determined at the first device in a process similar to the process used by the messaging server as described in process 200 of FIG. 2.

At 306, additional information associated with the geographic location information is determined at the first device. For example, the message application executing at the first device may be also configured to determine additional information that is relevant to the geographic location information of the message. Additional information (e.g., map, pictures, link) associated with the geographic location information (or the alternative geographic location information) may be determined at the first device in a process similar to the process used by the messaging server as described in process 200 of FIG. 2.

At 308, the message and the additional information are sent to a second device. The original message, including the geographic location information, and the additional information determined based on the geographic location information are sent to and displayed at the second device. In some embodiments, the message and the additional information are sent by the first device directly to the second device (e.g., over a network) without first sending the message and the additional information to the messaging server. For example, the first device may avoid sending the message and the additional information to the messaging server in the event that the first device and the second device are engaged in a point-to-point connection. In some embodiments, the message and the additional information are first sent by the first device to the messaging server and then the messaging server forwards the message and additional information to the second device.

Figure 4:
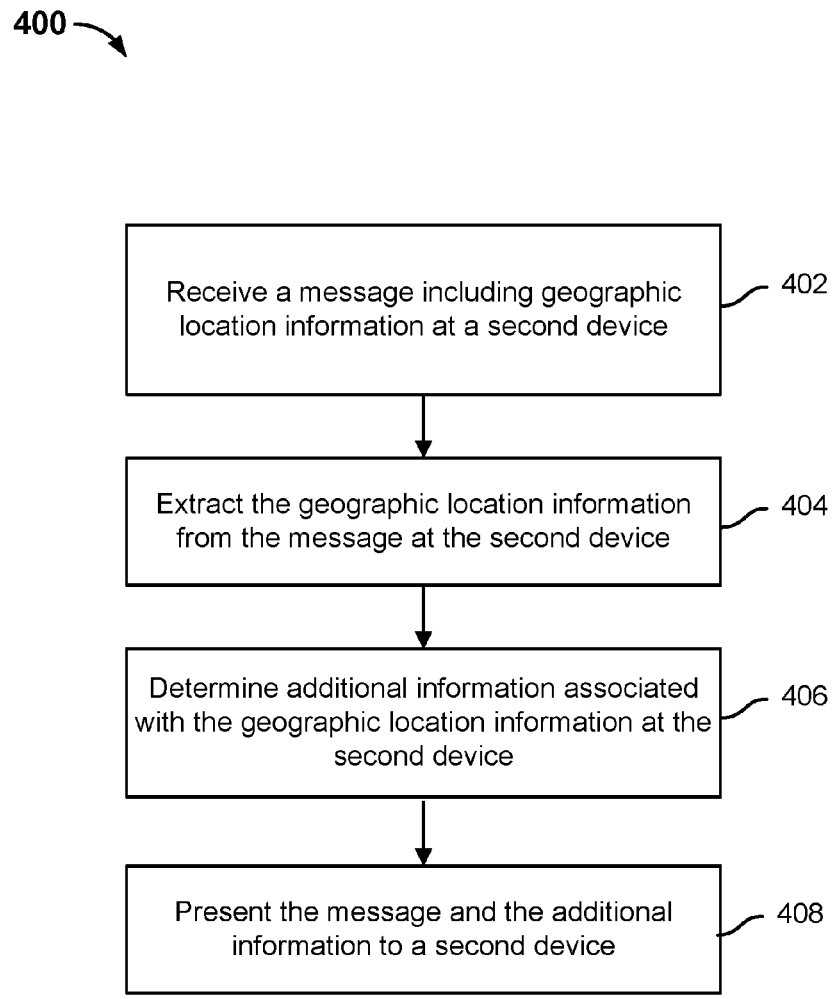
FIG. 4 is a flow diagram showing an embodiment of a process for determining additional information associated with geographic location information included in a message.

FIG. 4 is a flow diagram showing an embodiment of a process for determining additional information associated with geographic location information included in a message. In some embodiments, process 400 is implemented at second device 104 of FIG. 1.

Process 400 shows an example of using the second device (the device that receives the message) to determine additional information associated with the geographic location information included in the message. Process 400 shows that in some embodiments, the second device, the device that receives the message, may be configured to determine the additional information associated with the geographic location information.

At 402, a message including geographic location information is received at a second device. In some embodiments, the message is received directly from a first device. In some embodiments, the message is received from a messaging server (e.g., that had received the message from the first device).

At 404, the geographic location information is extracted from the message. For example, the message application executing at the second device may be configured to recognize and extract the geographic location information portion from the message received from a different device. In some embodiments, the geographic location information may be extracted from the message and the alternative geographic location information may be determined by the second device in a process similar to the process used by the messaging server as described in process 200 of FIG. 2.

At 406, additional information associated with the geographic location information is determined at the second device. For example, the message application executing at the second device may be also configured to determine additional information that is relevant to the geographic location information of the message. Additional information (e.g., map, pictures, link) associated with the geographic location information (or the alternative geographic location information) may be determined at the second device in a process similar to the process used by the messaging server as described in process 200 of FIG. 2.

At 408, the message and the additional information are presented at the second device. Once the second device has determined the additional information based on the message, the second device presents the message and the additional information simultaneously. For example, the message and the additional information may be displayed within the messaging application interface. In the event that a link is displayed, the second user using the second device may select the link to access further information. In the event that an embedded portion of a map application is displayed, the second user using the second device may interact with the map to view more areas of the map. The second user using the second device may input another message into the user interface of the second device to be sent to the first user of the first device.

In some embodiments, designated geographic location identifiers may be used to denote the portion of a message that is associated with geographic location information. For example, a user inputting the message at a first device may input a preset first separation symbol prior to inputting the geographic location information and then input the preset second separation symbol after inputting the geographic location information. By doing so, determination of the portion of the message associated with the geographic location information may be simplified (e.g., for the messaging server, the first device, or the second device) because the geographic location information of a message can be immediately identified as the content in the message that is in between the preset first and second separation symbols.

Depending on the embodiment used, the messaging server, the first device, or the second device may search through the text associated with the message to determine whether the preset first and second separation symbols are present in the message and in the event they are, determine that the geographic location information is the portion of the message that is in between the preset first and second separation symbols.

The preset first and second separation symbols may be the same symbol, or they may be different symbols. For example, the first separation symbol might be a left round bracket, square bracket, or curly bracket, and the second separation symbol might be a right round bracket, square bracket, or curly bracket. In another example, the first and second separation symbols might be "/——" and "——/," respectively, for example.

Figure 5:
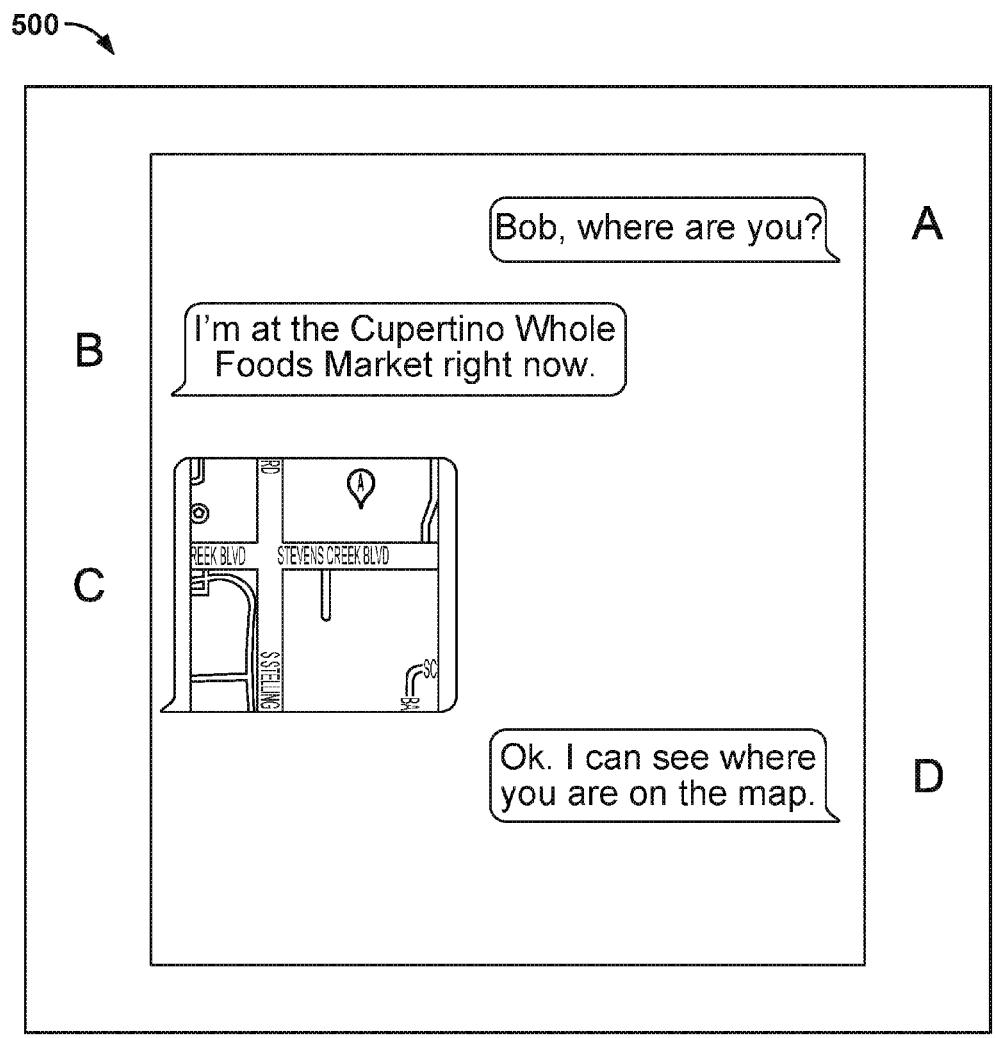
FIG. 5 is a diagram showing an example of a display of received and sent messages.

FIG. 5 is a diagram showing an example of a display of received and sent messages. Display 500 may be associated with a messaging application executing at a device. Display 500 includes four messages (messages A, B, C, and D) that were exchanged between a first user and a second user. In the example, messages B and C are sent by a first user to a second user and messages A and D are sent by the second user to the first user. In message A, the second user asks the first user, "Bob, where are you?" In message B, the first user says that "I'm at the Cupertino Whole Foods Market right now." Because the geographic location information of "Cupertino Whole Foods Market" is found in message B, additional information associated with the "Cupertino Whole Foods Market" is determined. In the example, the additional information determined for "Cupertino Whole Foods Market" comprises a portion of a map that includes a marker at the location of the "Cupertino Whole Foods Market." This map may have been determined by the sending device, the receiving device, or by a server associated with the messaging service. Message C, including the map associated with "Cupertino Whole Foods Market," is automatically sent with the first user's message, message B. The second user who receives messages B and C may instantly learn where on a map the first user has indicated he is in a message (message B) that he had sent. While not shown in the example, the first user may have included separation symbols (e.g., "/—" and "—/") before and after the geographic information of "Cupertino Whole Foods Market" in message B such that message B would have read "I'm at the/—Cupertino Whole Foods Market—/right now." Also, additional information associated with "Cupertino Whole Foods Market" other than a map could have been sent in message C.

Figure 6:
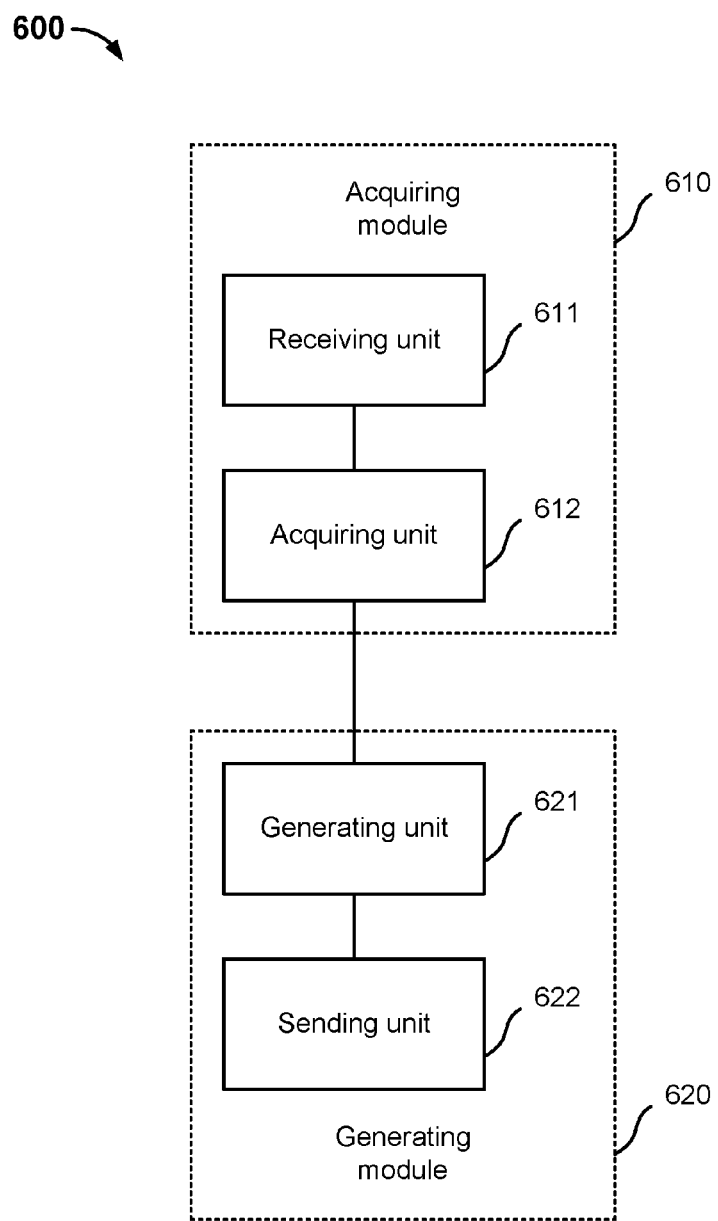
FIG. 6 is a diagram showing an embodiment of a system for determining additional information associated with geographic location information included in a message.

FIG. 6 is a diagram showing an embodiment of a system for determining additional information associated with geographic location information included in a message. In the example, system 600 includes acquiring module 610 and generating module 620. In the example, acquiring module 610 further includes receiving unit 611 and acquiring unit 612 and generating module 620 further includes generating unit 621 and sending unit 622. In the example, system 600 is associated with a messaging server and the messaging server is configured to recognize and extract the geographic location information from the message and determine additional information based on the geographic location information.

The modules and units can be implemented as software components executing on one or more processors, as hardware such as programmable logic devices and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules and units may be implemented on a single device or distributed across multiple devices.

Acquiring module 610 is configured to extract geographic location information from the message input by a first user at a first device.

Generating module 620, which is connected to acquiring module 610, is configured to determine additional information (e.g., a picture associated with the geographic location or a link to the picture and to display the picture or link thereof) associated with the geographic location information at a second device associated with a second user.

In system 600, acquiring module 610 is configured to recognize and extract the geographic location information from the message. Generating module 620 is configured to find additional information (e.g., a picture, a link, a portion of a map) that is relevant to the geographic location information and display the additional information along with the message at the second device associated with the second user that is participating in the chat.

In the example of system 600, a messaging server may perform the actions of recognizing and extracting the geographic location information from the message, determining additional information relevant to the geographic location information, and displaying the additional information along with the message to the second user. Receiving unit 611 is configured to receive a message input by a first user associated with a first device. Acquiring unit 612 is configured to recognize and extract the geographic location information from the message received by receiving unit 611. Generating unit 621, which is connected to acquiring unit 612, is configured to find additional information relevant to the geographic location information. Sending unit 622 is configured to send the additional information determined by generating unit 621 and the message to a second device associated with a second user.

Figure 7:
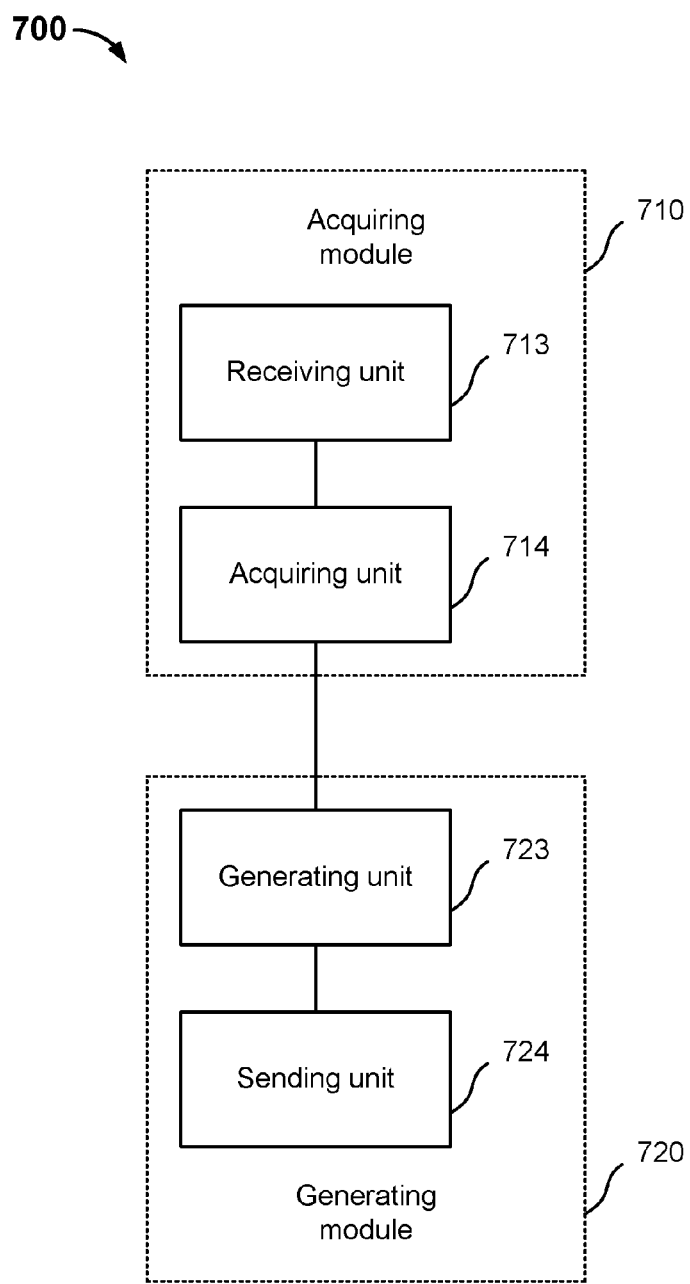
FIG. 7 is a diagram showing an embodiment of a system for determining additional information associated with geographic location information included in a message.

FIG. 7 is a diagram showing an embodiment of a system for determining additional information associated with geographic location information included in a message. In the example, system 700 includes acquiring module 710 and generating module 720. In the example acquiring module 710 further includes receiving unit 713 and acquiring unit 714 and generating module 720 further includes generating unit 723 and sending unit 724. In the example, system 700 is associated with a first device and the first device is configured to recognize and extract the geographic location information from the message and determine additional information based on the geographic location information. In the example, the first device is configured to generate the message to be sent to a second device.

Receiving unit 713 is configured to receive message content (e.g., alphanumeric characters and/or a voice recording) input by a first user using a first device. Acquiring unit 714 is configured to recognize and extract geographic location information from the message received by receiving unit 713. Generating unit 723, which is connected to acquiring unit 714, is configured to determine additional information associated with the geographic location information. Sending unit 724 is configured to send the additional information determined by generating unit 723 and the message to the second device associated with a second user.

Figure 8:
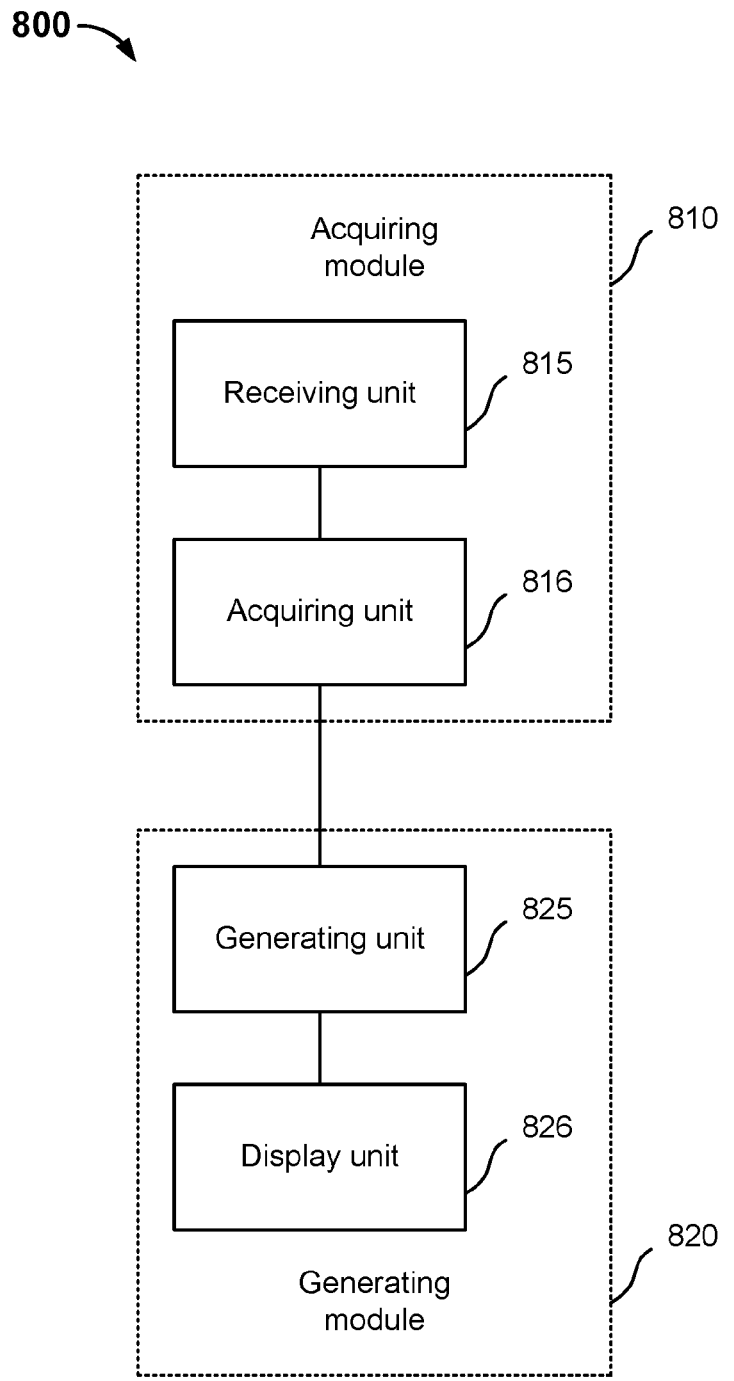
FIG. 8 is a diagram showing an embodiment of a system for determining additional information associated with geographic location information included in a message.

FIG. 8 is a diagram showing an embodiment of a system for determining additional information associated with geographic location information included in a message. In the example, system 800 includes acquiring module 810 and generating module 820. In the example acquiring module 810 further includes receiving unit 815 and acquiring unit 816 and generating module 820 further includes generating unit 825 and display unit 826. In the example, system 800 is associated with a second device and the second device is configured to recognize and extract the geographic location information from the message and determine additional information based on the geographic location information. In the example, the second device is configured to receive a message sent from a first device.

Receiving unit 815 is configured to receive a message sent by a first device. Acquiring unit 816 is configured to recognize and extract geographic location information from a message received from receiving unit 815. Generating unit 825, which is connected to acquiring unit 816, is configured to determine additional information based on the geographical location information. Display unit 826 is configured to send the message along with the additional information.

Figure 9:
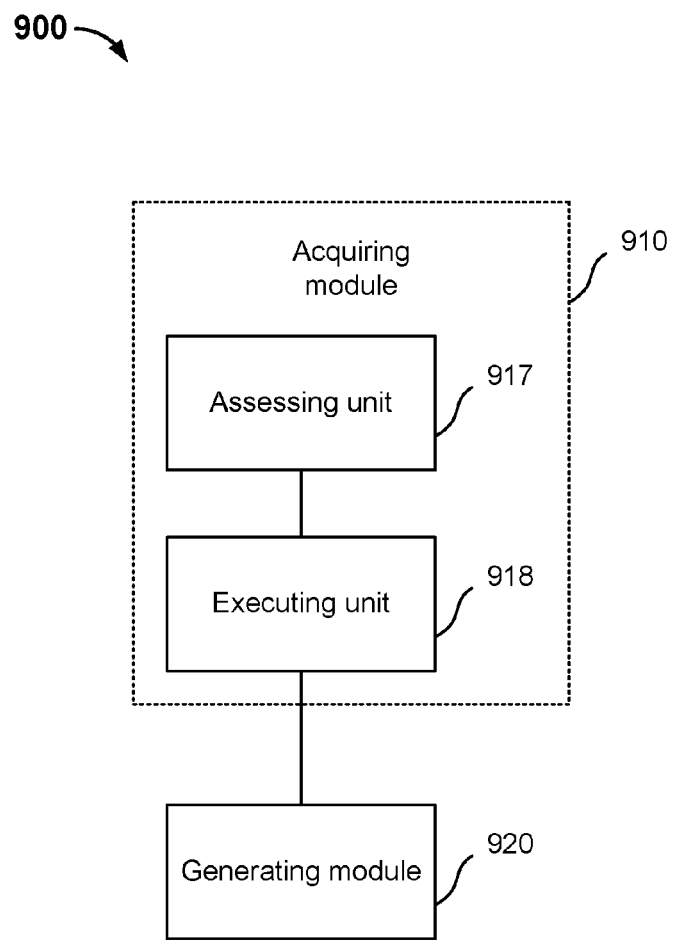
FIG. 9 is a diagram showing an embodiment of an acquiring module and a generating module.

FIG. 9 is a diagram showing an embodiment of an acquiring module and a generating module. In some embodiments, the example of acquiring module 910 may be used to implement one or more of acquiring module 610 of FIG. 6, acquiring module 710 of FIG. 7, and acquiring module 810 of FIG. 8. In the example, system 900 includes acquiring module 910, which in turn includes assessing unit 917 and executing unit 918.

Assessing unit 917 is configured to determine whether preset geographic location identifiers are included a message.

Executing unit 918, which is connected to assessing unit 917 and generating module 920, is configured to determine that the content of the message that is in between the preset geographic location identifiers is the geographic location information. In some embodiments, the preset geographic location identifiers comprise a first separation symbol and a second separation symbol.

Persons skilled in the art should understand that all the components of the devices and/or server provided described above in the embodiments of the present application and all the steps in the methods may be concentrated onto a single computing device or distributed across a network composed of multiple computing devices. Optionally, they can be realized using program codes executable by computing devices. Thus, they can be stored on storage devices and executed by computing devices. Or they may be made separately into various integrated circuit modules, or their multiple modules or steps may be made into a single integrated circuit module. Thus, the present application is not limited to any specific combination of hardware and software.

Although the modes of implementation are as disclosed by the present invention above, the described content serves only to facilitate understanding of the modes of implementation employed by the present invention and does not limit the present invention. Any person skilled in the art of the present invention may, so long as he does not depart from the spirit and scope disclosed by the present invention, effect any modification or variation in the forms and details of implementation. Yet the scope of protective patent protection of the present invention must continue to be defined by the claims attached hereto.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A messaging server, comprising:
one or more processors configured to:
receive a message including geographic location information within the body of the message from a first user of a first device;
extract the geographic location information from the message, wherein to extract the geographic location information from the message includes to perform recognition on at least a portion of the message using a recognition technique associated with a format associated with the message;
determine additional information associated with the geographic location information; and
send the message and the additional information to a second user of a second device; and
one or more memories coupled to the one or more processors and configured to provide the one or more processors with instructions.

2. The messaging server of claim 1, wherein the one or more processors are further configured to receive identifying information associated with the second device.

3. The messaging server of claim 1, wherein the geographic location information includes one or more of: an address, a name of a business, an area, a name of a public location, and a name of a building.

4. The messaging server of claim 1, wherein the additional information includes one or more of: a map associated with the geographic location information, a picture associated with the geographic location information, and a link associated with information relevant to the geographic location information.

5. The messaging server of claim 1, wherein to determine the additional information associated with the geographic location information includes the one or more processors being further configured to:
determine that the geographic location information is not successfully validated;
determine alternative geographic location information based on at least a portion of the geographic location information; and
determine additional information associated with the alternative geographic location information.

6. The messaging server of claim 1, wherein the one or more processors are further configured to send computer instructions with the message and the additional information to the second device, wherein the computer instructions are configured to cause the second device to simultaneously display the message and the additional information.

7. The messaging server of claim 1, wherein to extract the geographic location information from the message includes to:
determine whether preset geographic location identifiers are included in the message; and
determine that the at least portion of the message in between a first preset geographic location identifier and a second preset geographic location identifier comprises the geographic location information.

8. A method for sending a message, comprising:
receiving the message including geographic location information within the body of the message from a first user of a first device;
extracting the geographic location information from the message, wherein extracting the geographic location information from the message includes performing recognition on at least a portion of the message using a recognition technique associated with a format associated with the message;
determining additional information associated with the geographic location information; and
sending the message and the additional information to a second user of a second device.

9. The method of claim 8, wherein determining the additional information associated with the geographic location information includes:
determining that the geographic location information is not successfully validated;

determining alternative geographic location information based on at least a portion of the geographic location information; and determining additional information associated with the alternative geographic location information.

10. The method of claim 8, further comprising sending computer instructions with the message and the additional information to the second device, wherein the computer instructions are configured to cause the second device to simultaneously display the message and the additional information.

11. A first device, comprising:
one or more processors configured to:
receive a message including geographic location information within the body of the message from a first user via a user interface of the first device;
extract the geographic location information from the message, wherein to extract the geographic location information from the message includes to perform recognition on at least a portion of the message using a recognition technique associated with a format associated with the message;
determine additional information associated with the geographic location information; and
send the message and the additional information to a second user of a second device; and
one or more memories coupled to the one or more processors and configured to provide the one or more processors with instructions.

12. The first device of claim 11, wherein the message comprises text.

13. The first device of claim 11, wherein the message comprises a voice recording.

14. The first device of claim 11, wherein to receive the message includes to receive a preset geographic location identifier.

15. The first device of claim 11, wherein the message and the additional information are sent to a messaging server, wherein the messaging server is configured to forward the message and the additional information to the second device.

16. The first device of claim 11, wherein to determine the additional information associated with the geographic location information includes the one or more processors being further configured to:
determine that the geographic location information is not successfully validated;
determine alternative geographic location information based on at least a portion of the geographic location information; and
determine additional information associated with the alternative geographic location information.

17. A second device, comprising:
one or more processors configured to:
receive a message including geographic location information within the body of the message from a first user of a first device;
extract the geographic location information from the message, wherein to extract the geographic location information from the message includes to perform recognition on at least a portion of the message using a recognition technique associated with a format associated with the message;
determine additional information associated with the geographic location information; and
present the message and the additional information at a user interface of the second device; and
one or more memories coupled to the one or more processors and configured to provide the one or more processors with instructions.

18. The second device of claim 17, wherein the message and the additional information are simultaneously presented.

19. The second device of claim 17, wherein to determine the additional information associated with the geographic location information includes the one or more processors being further configured to:
determine that the geographic location information is not successfully validated;
determine alternative geographic location information based on at least a portion of the geographic location information; and
determine additional information associated with the alternative geographic location information.

* * * * *